United States Patent
Kamiya et al.

(10) Patent No.: US 12,233,833 B2
(45) Date of Patent: Feb. 25, 2025

(54) BRAKING ASSIST CONTROL DEVICE, BRAKING ASSIST SYSTEM, AND BRAKING ASSIST CONTROL METHOD FOR VEHICLE

(71) Applicants: DENSO CORPORATION, Kariya (JP); TOYOTA JIDOSHA KABUSHIKI KAISHA, Toyota (JP)

(72) Inventors: Kei Kamiya, Kariya (JP); Akitoshi Minemura, Kariya (JP); Muneaki Jono, Susono (JP); Toshinori Okita, Gotemba (JP); Tasuku Usui, Gotemba (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 479 days.

(21) Appl. No.: 17/406,578

(22) Filed: Aug. 19, 2021

(65) Prior Publication Data

US 2021/0380083 A1    Dec. 9, 2021

Related U.S. Application Data

(63) Continuation of application No. PCT/JP2020/003747, filed on Jan. 31, 2020.

(30) Foreign Application Priority Data

Feb. 22, 2019    (JP) .................................. 2019-30246

(51) Int. Cl.
*B60Q 9/00*    (2006.01)
*B60T 7/12*    (2006.01)

(52) U.S. Cl.
CPC .................. *B60T 7/12* (2013.01); *B60Q 9/00* (2013.01); *B60T 2201/022* (2013.01);
(Continued)

(58) Field of Classification Search
CPC ..... B60Q 9/008; B60T 7/12; B60T 2201/022; B60T 2201/024; B60T 2201/03; B60T 2210/30; B60T 2210/32
(Continued)

(56) References Cited

U.S. PATENT DOCUMENTS 9,129,519 B2 * 9/2015 Aoude ..................... G08G 1/00
10,229,592 B1 * 3/2019 Elsheemy ........ G08G 1/096725
(Continued)

FOREIGN PATENT DOCUMENTS

JP    2010-205147 A    9/2010
JP    2015-170233 A    9/2015
(Continued)

*Primary Examiner* — Erick R Solis
(74) *Attorney, Agent, or Firm* — Maschoff Brennan

(57) ABSTRACT

A braking assist control device for a vehicle including a detector and a braking assist control device is provided. The braking assist control device includes an acquisition unit configured to acquire information on an ambient environment of an own vehicle from the detector, and a control unit configured to cause the braking assist device to perform intersection entry prevention assist in a case where it is determined, using the acquired information on the ambient environment, that the own vehicle is approaching an intersection and an own lane in which the own vehicle is traveling is a non-priority lane with respect to an intersecting lane.

7 Claims, 5 Drawing Sheets

(52) U.S. Cl.
CPC ..... *B60T 2201/024* (2013.01); *B60T 2201/03* (2013.01); *B60T 2210/30* (2013.01); *B60T 2210/32* (2013.01)

(58) Field of Classification Search
USPC .............................................. 701/70, 96, 97
See application file for complete search history.

(56) References Cited

U.S. PATENT DOCUMENTS

| | | | |
|---|---|---|---|
| 2012/0274481 A1* | 11/2012 | Ginsberg | G08G 1/096883 |
| | | | 340/905 |
| 2016/0328968 A1* | 11/2016 | Elsheemy | G08G 1/0962 |
| 2016/0335892 A1 | 11/2016 | Okada et al. | |
| 2018/0158329 A1* | 6/2018 | Benhammou | G08G 1/07 |
| 2018/0208203 A1* | 7/2018 | Gordon | B60W 10/04 |
| 2020/0231065 A1* | 7/2020 | Uchimura | G08G 1/166 |

FOREIGN PATENT DOCUMENTS

| | | |
|---|---|---|
| JP | 2017-224026 A | 12/2017 |
| JP | 2018-041264 A | 3/2018 |
| JP | 2019-027996 A | 2/2019 |

\* cited by examiner

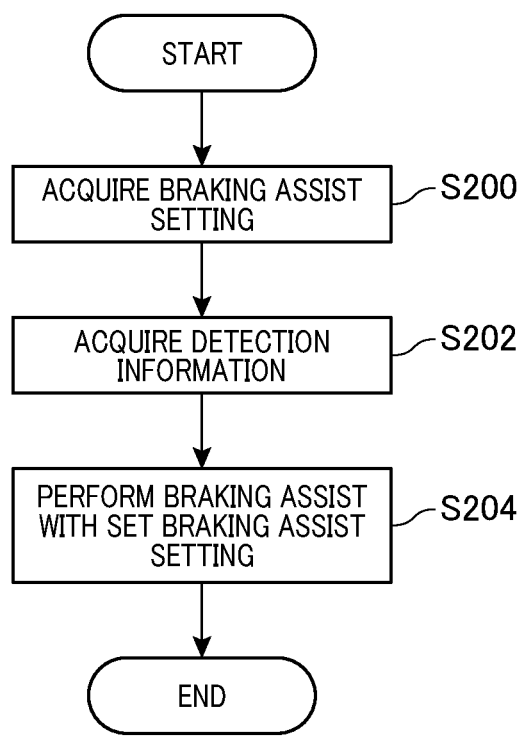

BRAKING ASSIST CONTROL DEVICE, BRAKING ASSIST SYSTEM, AND BRAKING ASSIST CONTROL METHOD FOR VEHICLE

CROSS-REFERENCE TO RELATED APPLICATION

The present application is based on and claims the benefit of priority from earlier Japanese Patent Application No. 2019-30246 filed on Feb. 22, 2019, the description of which is incorporated herein by reference.

BACKGROUND

Technical Field

The present disclosure relates to a braking assist control device, a breaking assist control system, and a braking assist control method for a vehicle, and more particularly, to a technique for controlling braking assist at an intersection.

Related Art

A technique has been proposed which, when an own vehicle crosses an oncoming lane at an intersection, changes deceleration with respect to a first mobile body which moves in the oncoming lane and also with respect to a second mobile body present after the own vehicle crosses the oncoming lane in accordance with a time difference between a time at which the own vehicle reaches a position at which a planned track of the own vehicle intersects with a predicted track of the first mobile body, and a time at which the own vehicle reaches a position at which the planned track of the own vehicle intersects with a predicted track of the second mobile body.

SUMMARY

An aspect provides a braking assist control device for a vehicle including a detector and a braking assist device. The braking assist control device includes: an acquisition unit configured to acquire information on an ambient environment of an own vehicle from the detector; and a control unit configured to cause the braking assist device to perform intersection entry prevention assist in a case where it is determined, using the acquired information on the ambient environment, that the own vehicle is approaching an intersection and an own lane in which the own vehicle is traveling is a non-priority lane with respect to an intersecting lane.

BRIEF DESCRIPTION OF THE DRAWINGS

In the accompanying drawings:

FIG. 5 is a flowchart illustrating processing flow of a braking assist process to be performed by a command from the braking assist control device according to the first embodiment.

DETAILED DESCRIPTION OF THE PREFERRED EMBODIMENTS

A technique has been proposed which, when an own vehicle crosses an oncoming lane at an intersection, changes deceleration with respect to a first mobile body which moves in the oncoming lane and also with respect to a second mobile body present after the own vehicle crosses the oncoming lane in accordance with a time difference between a time at which the own vehicle reaches a position at which a planned track of the own vehicle intersects with a predicted track of the first mobile body, and a time at which the own vehicle reaches a position at which the planned track of the own vehicle intersects with a predicted track of the second mobile body (see, for example, JP 2015-170233 A).

However, in a case where braking assist of decelerating or stopping the own vehicle inside an intersection is performed to avoid a collision with a first mobile body which is a primary object and the own vehicle stays inside the intersection, for example, there is a risk that the own vehicle may collide with a second mobile body which is a secondary object different from the primary object in a case where an own lane is a non-priority lane and an intersecting lane is a priority lane, or in a case where a traffic light on the own lane is red.

Thus, a technique is desired which avoids or prevents the own vehicle from colliding with the secondary object, which is traveling in a priority lane, by braking assist being performed with respect to the primary object in a case where the own vehicle which is approaching the intersection is traveling in a non-priority lane or a lane in a non-priority state.

A braking assist control device for a vehicle, a braking assist control system, and a braking assist control method for a vehicle according to the present disclosure will be described below on the basis of some embodiments.

First Embodiment

Figure 1:
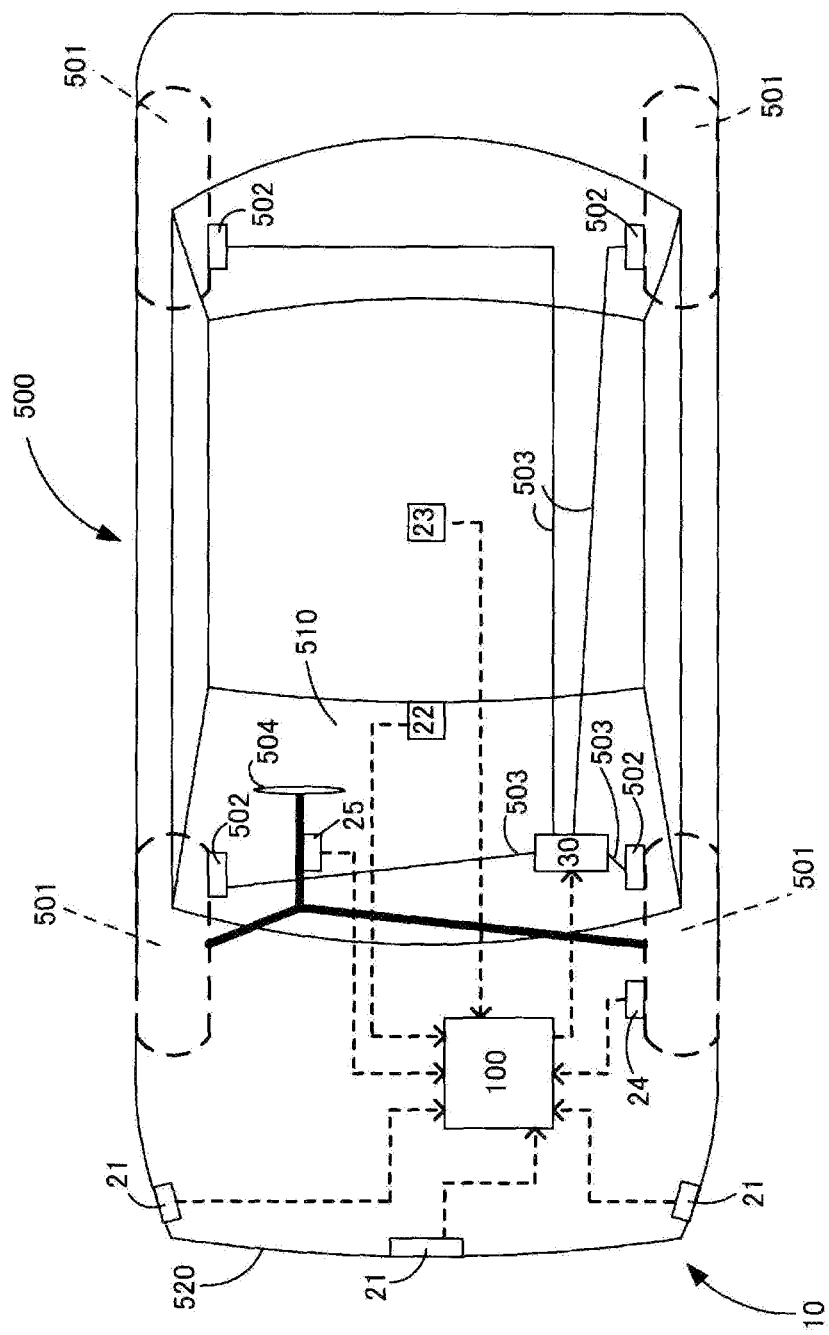
FIG. 1 is an explanatory diagram illustrating a vehicle in which a braking assist control device according to a first embodiment is installed.

As illustrated in FIG. 1, a braking assist control device 100 according to the first embodiment is used in a state where the braking assist control device 100 is installed in a vehicle 500 including a detector and a braking assist device. The braking assist control device 100 only requires to include at least a control section and an acquisition section, and a braking assist control system 10 includes a millimeter-wave radar 21, a camera 22, a yaw rate sensor 23, a wheel speed sensor 24, a rotational angle sensor 25 as detectors, and a braking assist device 30 in addition to the braking assist control device 100. The vehicle 500 includes wheels 501, braking devices 502, a braking line 503, a steering wheel 504, a windshield 510, and a front bumper 520. Note that the vehicle 500 may include a lidar (laser radar) in place of or along with the millimeter-wave radar 21 as a detector and only requires to include at least one of the millimeter-wave radar 21, the lidar and the camera 22 as a detector. In the present embodiment, the millimeter-wave radar 21 and the camera 22 are provided as detectors. A detection signal by the millimeter-wave radar 21 and a detection signal by the camera 22 may be used after being subjected to fusion processing.

In the vehicle 500, the braking devices 502 are provided at the respective wheels 501. The respective braking devices 502 implement braking of the respective wheels 501 by a brake fluid pressure supplied via the braking line 503 in accordance with brake pedal operation by a driver. The braking line 503 includes a brake piston which derives a brake fluid pressure in accordance with the brake pedal operation, and a brake fluid line. In the present embodiment, the braking assist device 30, that is, an actuator is provided to the braking line 503, which enables fluid pressure control to be performed independently of the brake pedal operation, so that braking assist is achieved. Note that the actuator as the braking assist device 30 may be an actuator to be used in an antilock brake system (ABS) or may be a separate actuator dedicated for braking assist. It is also possible to employ a configuration where actuators provided to the respective braking devices 502 are activated using a control signal line in place of the brake fluid line as the braking line 503. The steering wheel 504 is connected to wheels 501 on a front side via a steering rod and a steering mechanism. The braking assist device 30 may include the braking devices 502 and the braking line 503 in addition to the actuator.

Figure 2:
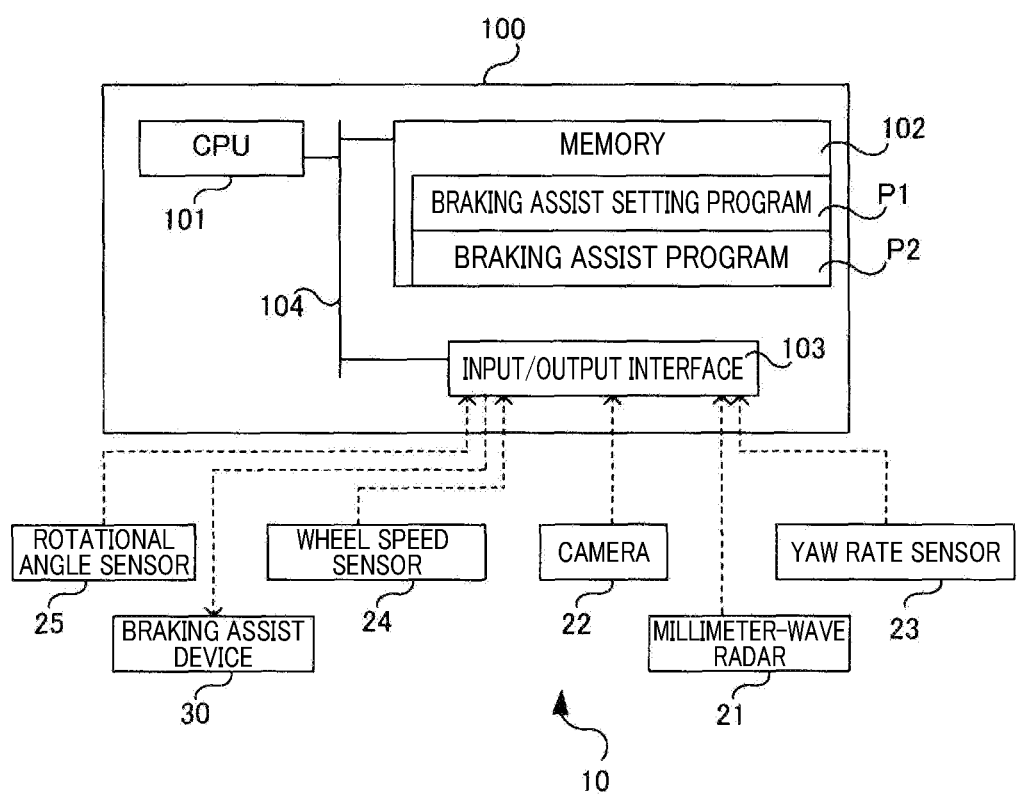
FIG. 2 is a block diagram illustrating a functional configuration of the braking assist control device according to the first embodiment.

As illustrated in FIG. 2, the braking assist control device 100 includes a central processing unit (CPU) 101 as a control unit, a memory 102, and an input/output interface 103 as an acquisition unit, and a bus 104. The CPU 101, the memory 102, and the input/output interface 103 are connected so as to be able to perform bidirectional communication via the bus 104. The memory 102 includes a memory, for example, a ROM which stores a braking assist setting program P1 which sets intersection braking assist setting for preventing entry into an intersection when the vehicle 500 is approaching the intersection, and a braking assist program P2 for performing braking assist by the braking assist device 30 in a non-volatile manner and in a read-only manner, and a memory, for example, a RAM which allows read and write by the CPU 101. The CPU 101 functions as a control unit which sets intersection braking assist of preventing entry into an intersection in a case where an own lane is a non-priority lane when the own vehicle is approaching the intersection, sets standard braking assist in a case where the own lane is a priority lane or in a case other than a case where the own vehicle is approaching the intersection, and causes the braking assist device 30 to perform braking assist with the set braking assist setting by loading the braking assist setting program P1 stored in the memory 102 to a read-write memory and executing the braking assist setting program P1, and functions as a braking assist control unit which controls braking assist by the braking assist device 30 with the braking assist setting set by executing the braking assist program P2 in a similar manner. The CPU 101 may be a single CPU or may be a plurality of CPUs which execute respective programs, or may be a multicore type CPU which can execute a plurality of programs at the same time.

The millimeter-wave radar 21, the camera 22, the yaw rate sensor 23, the wheel speed sensor 24, the rotational angle sensor 25, and the braking assist device 30 are respectively connected to the input/output interface 103 via control signal lines. Detection information is input from the millimeter-wave radar 21, the camera 22, the yaw rate sensor 23, the wheel speed sensor 24, and the rotational angle sensor 25, and a control signal which gives an instruction to drive the braking devices 502 with the set braking assist setting is output to the braking assist device 30.

The millimeter-wave radar 21 is a sensor which detects a distance, a relative speed and an angle of a target with respect to the vehicle 500 by emitting millimeter waves and receiving reflected waves reflected by the object. In the present embodiment, the millimeter-wave radars 21 are disposed at the center of the front bumper 520 and on both side surfaces of the front bumper 520. An unprocessed detection signal output from the millimeter-wave radar 21 is subjected to signal processing by an ECU at the millimeter-wave radar 21, and input to the braking assist control device 100 as a detection signal including a detection point or a detection point sequence indicating one or a plurality of representative positions of the target. Alternatively, a signal indicating an unprocessed received wave may be input to the braking assist control device 100 from the millimeter-wave radar 21 as the detection signal. In a case where an unprocessed received wave is used as the detection signal, the braking assist control device 100 performs signal processing for specifying a distance, a relative speed and an angle of the target.

The camera 22, which is an image pickup device including an image pickup element such as a CCD and a CMOS or an image pickup element array, is a sensor which outputs contour information on the object as image data which is a detection result by receiving visible light. The image data generated by the camera 22 is subjected to, for example, classification processing of the object using semantic segmentation by an ECU provided to the camera 22, and image regions indicating respective objects are respectively extracted by coupling pixels indicating the same object. In a case where classification processing is not performed at the camera 22, unprocessed image data captured by the camera 22 is input to the braking assist control device 100 as a detection signal. In this case, segmentation processing, or the like, of the target is performed at the braking assist control device 100. In the present embodiment, the camera 22 is disposed at a center of an upper part of the windshield 510. The image data output from the camera 22 may be black and while image data. In this case, brightness values are used in segmentation. The camera 22 may be a monocular camera or may be a compound-eye stereo camera.

The yaw rate sensor 23 is a sensor which detects a rotational angular velocity of the vehicle 500. The yaw rate sensor 23 is, for example, disposed at a central portion of the vehicle. A detection signal output from the yaw rate sensor 23 is a voltage value proportional to a rotational direction and an angular velocity.

The wheel speed sensor 24, which is a sensor detecting a rotational speed of the wheel 501, is provided to each wheel 501. A detection signal output from the wheel speed sensor 24 is a voltage value proportional to a wheel speed or a pulse wave indicating an interval in accordance with the wheel speed. Information such as a vehicle speed and a travel distance of the vehicle can be obtained by using the detection signal from the wheel speed sensor 24.

The rotational angle sensor 25 is a torque sensor which detects an amount of twist occurring at the steering rod by steering of the steering wheel 504, that is, steering torque. In the present embodiment, the rotational angle sensor 25 is provided to the steering rod which connects the steering wheel 504 and the steering mechanism. A detection signal output from the rotational angle sensor 25 is a voltage value proportional to the amount of twist.

The braking assist device 30, which is a braking assist unit, includes an actuator for implementing braking by the braking devices 502 regardless of brake pedal operation by the driver. In the present embodiment, the braking assist device 30 is provided to the braking line 503 and increases/decreases a hydraulic pressure at the braking line 503 in accordance with a control signal from the braking assist control device 100. The braking assist device 30 is configured by, for example, a module which includes an electric motor and a hydraulic piston driven by the electric motor. Alternatively, a braking control actuator which has already been introduced as an antiskid brake system or an antilock brake system may be used.

Figure 3:
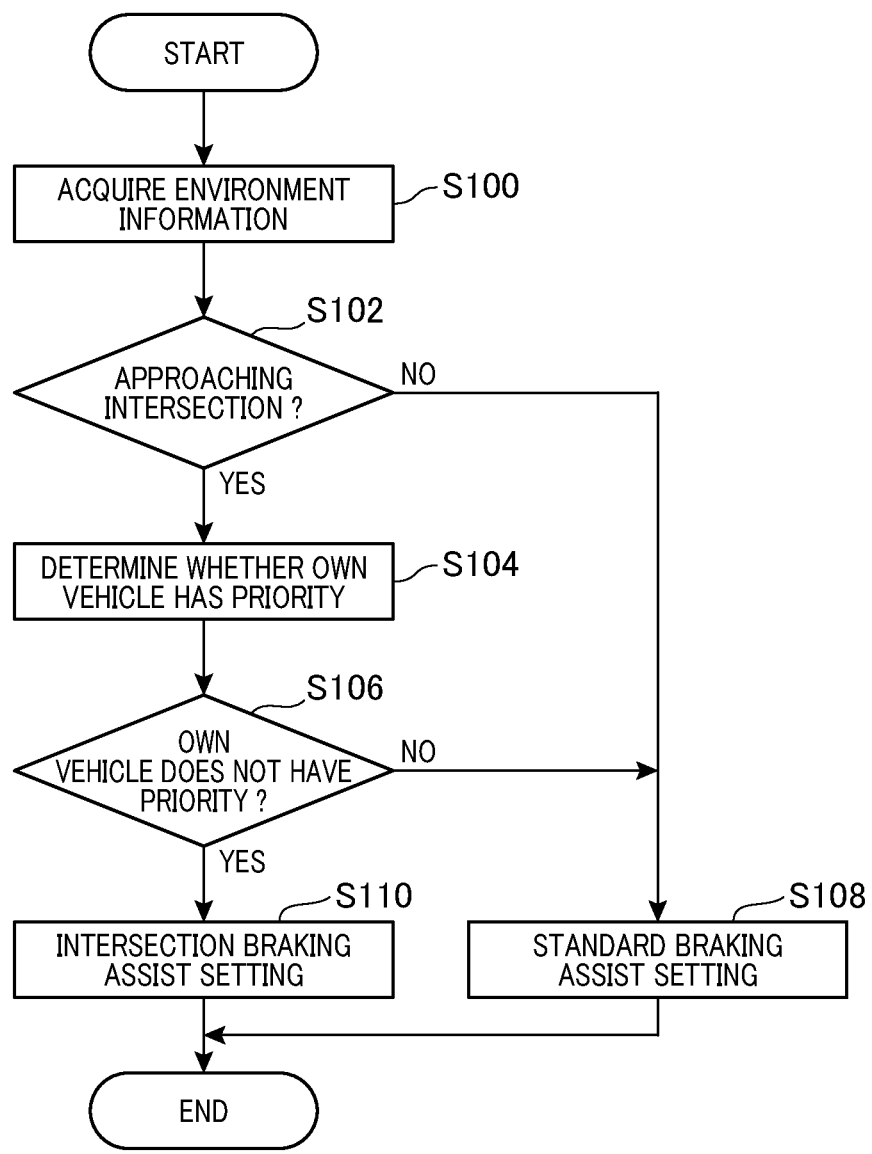
FIG. 3 is a flowchart illustrating processing flow of a braking assist setting process to be performed by the braking assist control device according to the first embodiment when an own vehicle is approaching an intersection.
Figure 4:
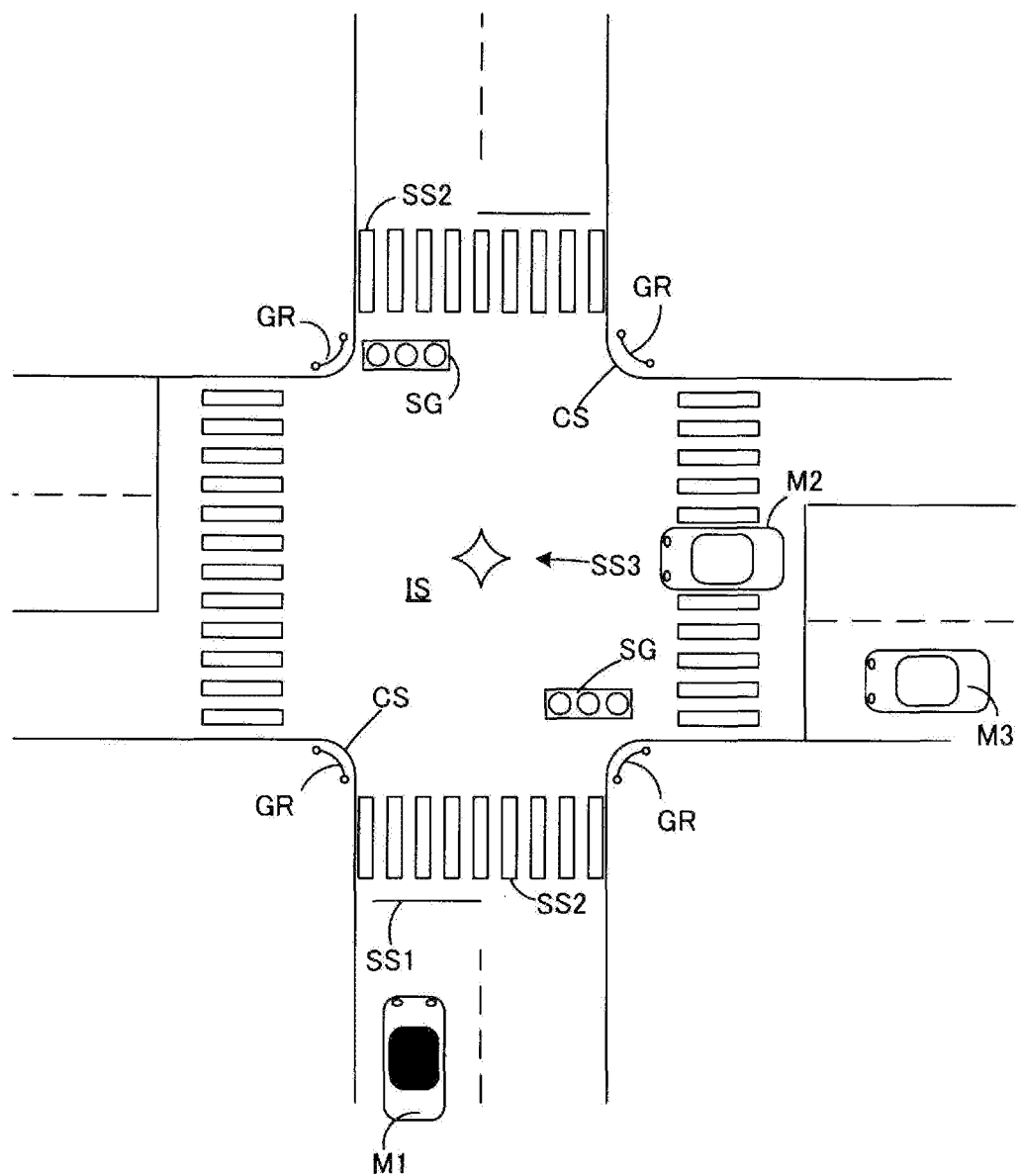
FIG. 4 is an explanatory diagram schematically illustrating an illustrative intersection environment in a case where the braking assist setting process is performed when the own vehicle is approaching the intersection according to the first embodiment.

A braking assist setting process performed when the vehicle is approaching an intersection, which is to be performed by the braking assist control device 100 according to the first embodiment, will be described with reference to FIG. 3 and FIG. 4. The processing routine illustrated in FIG. 3 is repeatedly executed at predetermined time intervals on the order of milliseconds, for example, from when a control system of the vehicle is started until when the control system is stopped, or from when a start switch is turned on until when the start switch is turned off by the CPU 101 executing the braking assist setting program P1.

The CPU 101 acquires ambient environment information around an own vehicle M1 by using a detection signal input from at least one of the millimeter-wave radar 21 and the camera 22 (step S100). The ambient environment information includes, for example, a shape of an intersection, a lighting state of a traffic light SG, road signs SS1, SS2 and SS3, information regarding a road traffic sign such as a stop sign, a slow sign and indication of priority which indicates that an intersecting road has priority, and information regarding a target to be subjected to braking assist.

The CPU 101 determines whether the own vehicle M1 is approaching an intersection IS, that is, moving toward the intersection IS by using the acquired environment information (step S102). Whether the own vehicle M1 is approaching the intersection IS can be determined, for example, by using at least one of operation of a direction indicator, a shape of the intersection, whether there is a traffic light SG, a stop line SS1 as a road sign, a crosswalk sign SS2 as a road sign, an intersection sign SS3 as a road sign, an intersection sign, and a road traffic sign such as a stop sign, a slow sign and indication of priority. The CPU 101 recognizes the shape of the intersection by using the detection signal input from at least one of the millimeter-wave radar 21 and the camera 22 and determines whether the own vehicle is to enter the intersection. The shape of the intersection includes, for example, an end portion of a center median, a curbstone CS which forms a stepped portion between a lane and a pathway, a guard rail GR provided along the intersection, and a guard pipe. The CPU 101 can, for example, recognize the above-described shape of the intersection on the basis of distribution characteristics of a dot sequence representing a target indicated by the detection signal input from the millimeter-wave radar 21. The CPU 101 further identifies the shape of the intersection, whether there is a traffic light SG, the road signs SS1, SS2 and SS3 and the road traffic sign by using the image data input from the camera 22 and determines whether the own vehicle is moving toward the intersection. The CPU 101 determines a visual shape of the object by performing edge extraction processing on the image data input from the camera 22 and performing pattern matching with shapes of objects prepared in advance and matching with color of objects prepared in advance. Note that the intersection IS is not limited to a junction of four roads, and may be a junction of three roads, or a junction of five or more roads.

In a case where the CPU 101 determines that the own vehicle M1 is approaching the intersection IS (step S102: Yes), the CPU 101 determines whether an own lane has priority or does not have priority over an intersecting lane which intersects with the own lane in which the own vehicle M1 travels (step S104). Whether the own lane has priority is determined using, for example, a road traffic sign such as a priority sign, a stop sign and a slow sign, indication on a road such as indication of priority, indication of stop and indication of slow or a lighting state of the traffic light SG. Further, to improve detection accuracy of the road traffic sign or indication on a road which is directed to the own vehicle M1, in a case where a distance between the detected road traffic sign or the detected indication on the road and the own vehicle M1 is equal to or less than a distance determined in advance, whether the own lane is a non-priority lane may be determined. The road traffic sign or the indication on the road indicates permanent relationship that the own lane is a non-priority lane and the intersecting lane is a priority lane, and a case where the traffic light is red for the own lane can be regarded as a state where the own lane is temporarily in a non-priority state, and the intersecting lane is in a priority state.

In a case where the CPU 101 determines that the own lane is not a non-priority lane or not in a non-priority state, that is, the own vehicle M1 is traveling on a priority road or a lane of a road in a priority state (step S106: No), the CPU 101 sets standard braking assist setting as the braking assist setting (step S108) and finishes the present processing routine. The standard braking assist setting is braking assist of avoiding a collision with a primary object for which braking assist is to be performed by stopping the own vehicle M1 or setting the speed of the own vehicle M1 to 0 km/h at a collision intersection point of an ongoing track of the primary object which is a crossing vehicle M2 in FIG. 4 and a planned track of the own vehicle M1. A crossing vehicle M3 which is a secondary object is traveling in a non-priority lane, and thus, even if the own vehicle M1 stops inside the intersection IS by avoiding a primary collision through performance of braking assist with respect to the crossing vehicle M2, a secondary collision between the own vehicle M1 and the crossing vehicle M3 which is the secondary object does not occur. The standard braking assist setting defines a braking start timing, that is, a TTCr [s] (time-to-collision) for determination to achieve the above-described condition, and further includes maintenance of a braking state over a time period determined in advance after braking assist is performed, that is, brake hold.

In a case where the CPU 101 determines that the own lane is a non-priority lane or is in a non-priority state, that is, the own vehicle M1 is traveling on a non-priority road or a lane of a road which is not in a priority state (step S106: Yes), the CPU 101 sets intersection braking assist setting as the braking assist setting (step S110) and finishes the present processing routine. The intersection braking assist setting is braking assist setting for preventing entry into the intersection IS and is intersection entry prevention assist. Specifically, a notification that the vehicle enters the intersection IS, encouragement of the driver to brake by weak braking force, early exertion of weak braking force, that is, low deceleration, performance of braking assist with weak braking force and early exertion of braking assist, and a notification are braking assist for encouraging the driver to stop the vehicle before the intersection IS by performing braking operation before entry into the intersection IS. These kinds of braking assist are, for example, performed by setting the stop line SS1 and the crosswalk SS2 as a stop position of the own vehicle M1. Assist of the braking operation is assist of braking operation to be performed by the driver, and for example, is braking assist for inhibiting or preventing the vehicle from entering the intersection IS by improving responsiveness to braking operation by the driver by performing pressurization to make the hydraulic pressure of the braking line 503 higher in advance. In a case where the own vehicle M1 enters the intersection IS while the vehicle M1 is traveling in a non-priority lane or a lane in a non-priority state and the standard braking assist for avoiding a primary collision with the crossing vehicle M2 which is the primary object is performed, there is a possibility that a secondary collision between the crossing vehicle M3, which is the secondary object and which is traveling in a priority lane, and the own vehicle M1, which is at a stop, may occur. According to the intersection braking assist setting, the own vehicle M1 is prevented or inhibited from entering the intersection IS while the own vehicle M1 is traveling in a non-priority lane or a lane in a non-priority state, so that it is possible to avoid or prevent a secondary collision.

The braking assist control device 100 performs a braking assist process with respect to a target of braking assist by the CPU 101 executing the braking assist program P2. The flowchart illustrated in FIG. 5 is repeatedly executed at time intervals determined in advance in a similar manner to the flowchart illustrated in FIG. 3.

The CPU 101 acquires the set braking assist setting (step S200). The CPU 101 acquires detection information detected by the millimeter-wave radar 21 and the camera 22 (step S202). The CPU 101 performs braking assist in accordance with the set braking assist setting (step S204) and finishes the present processing routine. In a case where the standard braking assist setting is set, the CPU 101 calculates a time-to-collision TTC to a collision intersection point by using a speed of the own vehicle M1 and a distance to the collision intersection point and performs braking assist of stopping the own vehicle M1 at the collision intersection point via the braking assist device 30 by using the calculated TTC and the TTCr for determination. In a case where the intersection braking assist setting is set, the CPU 101 gives a notification that the own vehicle M1 is approaching the intersection IS, encourages the driver to brake by weak braking force via the braking assist device 30, and executes early exertion of weak braking force while setting the stop line SS1 or the crosswalk SS2 as a collision intersection point via the braking assist device 30. The notification can be given with at least one of speech or display which notifies the driver that the own vehicle M1 is approaching the intersection. The CPU 101 may execute pressurization to make the hydraulic pressure of the braking line 503 higher in advance as assist of the braking operation.

According to the braking assist control device 100 according to the first embodiment described above, in a case where the own vehicle M1 is approaching the intersection IS and is traveling in a non-priority lane, braking assist by intersection braking assist setting of preventing or inhibiting the own vehicle M1 from entering the intersection IS is performed, and thus, in a case where the own vehicle M1 which is approaching the intersection IS is traveling in a non-priority lane or a lane in a non-priority state, performing braking assist with respect to the primary object can avoid or prevent a collision with the secondary object which is traveling in a priority lane. It is not easy to detect an accurate entry position at the intersection IS, and determination accuracy is low, and thus, there is a possibility that if the own vehicle M1 is stopped at the detected entry position at the intersection IS, a collision with the crossing vehicle M2 or M3 may not be avoided. Further, it is not easy to avoid a collision with the secondary object which cannot be easily predicted while performing braking assist with respect to the primary object inside the intersection IS. Concerning this point, the braking assist control device 100 according to the first embodiment performs braking assist of causing the driver to recognize entry into the intersection IS when the own vehicle M1 is approaching the intersection IS and performs braking assist of assisting braking operation by the driver, so that it is possible to prevent or inhibit the own vehicle M1 from entering the intersection IS. As a result, it is possible to avoid or prevent a secondary collision with the secondary object associated with avoidance of a primary collision with the primary object as well as avoid a primary collision with the primary object.

Other Embodiments (1) While in the above-described embodiment, the braking assist setting process and braking assist process are performed in different processing flows, the braking assist may be performed along with setting of the braking assist setting (step S108, step S110) illustrated in FIG. 3. In other words, the braking assist control device 100 may perform braking assist setting and braking assist with the set braking assist setting through the same processing routine.

(2) While in the above-described embodiment, the braking assist control device 100 is installed in the vehicle 500, the braking assist control device 100 may be provided outside the vehicle 500, for example, to a remote server. In this case, the braking assist control device 100 can perform braking assist for a plurality of vehicles 500 at remote locations.

(3) In the above-described embodiment, entry into an intersection is determined using a detection signal or image data from the millimeter-wave radar 21, the camera 22, the lidar or a stereo camera as a detector. Concerning this, entry into an intersection may be determined using information from an optical beacon or map information in a global navigation satellite system (GNSS) and a navigation system.

(4) While in the above-described respective embodiments, a control unit which sets braking assist setting when the vehicle is approaching an intersection is implemented with software by the CPU 101 executing the braking assist setting program P1. However, the control unit may be implemented with hardware by an integrated circuit or a discrete circuit programmed in advance. In other words, the control unit and the method in the above-described respective embodiments may be implemented by a dedicated computer configured by a processor and a memory which are programmed to execute one or a plurality of functions embodied by a computer program. Alternatively, the control unit and the method described in the present disclosure may be implemented by a dedicated computer which is provided by configuring a processor by one or more dedicated hardware logic circuits. Alternatively, the control unit and the method described in the present disclosure may be implemented by one or more dedicated computers configured by the combination of a processor and a memory programmed to perform one or a plurality of functions and a processor configured by one or more hardware logic circuits. Further, the computer program may be stored in a computer-readable non-transitory tangible storage medium as instructions to be executed by the computer.

While the present disclosure has been described above on the basis of the embodiments and modified examples, the above-described embodiments are provided to facilitate understanding of the present disclosure and do not limit the present disclosure. The present disclosure can be changed or modified without deviating from the gist and the scope of the claims, and the present disclosure includes equivalents thereof. For example, technical features in the embodiments and modified examples can be replaced or combined as appropriate to achieve part or all of the above-described effects. Further, the technical features which are not described as essential features in the present specification can be deleted as appropriate.

A first aspect provides a braking assist control device (100) for a vehicle (500) including a detector (21, 22) and a braking assist device (30). The braking assist control device includes: an acquisition unit (103) configured to acquire information on an ambient environment of an own vehicle from the detector; and a control unit (101, P1, P2) configured to cause the braking assist device to perform intersection entry prevention assist in a case where it is determined, using the acquired information on the ambient environment, that the own vehicle is approaching an intersection and an own lane in which the own vehicle is traveling is a non-priority lane with respect to an intersecting lane.

According to the braking assist device for a vehicle according to the first aspect, in a case where the own vehicle, which is approaching the intersection, is traveling in a non-priority lane or a lane in a non-priority state, performing braking assist with respect to a primary object can avoid or prevent the own vehicle from colliding with a secondary object, which is traveling in a priority lane.

A second aspect provides a braking assist control method for a vehicle (500). The method includes: acquiring information on an ambient environment of an own vehicle from a detector (21, 22); and causing a braking assist device (30) to perform intersection entry prevention assist in a case where it is determined, using the acquired information on the ambient environment, that the own vehicle is approaching an intersection and an own lane in which the own vehicle is traveling is a non-priority lane with respect to an intersecting lane.

According to the braking assist control method for a vehicle according to the second aspect, in a case where the own vehicle, which is approaching the intersection, is traveling in a non-priority lane or a lane in a non-priority state, performing braking assist with respect to a primary object can avoid or prevent the own vehicle from colliding with a secondary object, which is traveling in a priority lane. Note that the present disclosure can be also implemented as a braking assist control program for a vehicle or a computer-readable storage medium which stores thereon the program.

What is claimed is:

1. A braking assist control device for a vehicle equipped with a detector and a braking assist device, the braking assist control device comprising:
   an acquisition unit configured to acquire information on an ambient environment of an own vehicle from the detector; and
   a control unit configured to, based on the acquired information on the ambient environment,
      determine whether the own vehicle is approaching an intersection;
      determine whether an own lane in which the own vehicle is traveling is a non-priority lane with respect to an intersecting lane, in which a vehicle traveling in the own lane does not have priority over a vehicle traveling in the intersecting lane;
      determine whether the acquired information on the ambient environment indicates that the own lane is permanently a non-priority lane with respect to the intersecting lane; and
      cause the braking assist device to perform intersection entry prevention assist based on determining that the own vehicle is approaching the intersection, the own lane is a non-priority lane with respect to the intersecting lane, and the acquired information indicating that the own lane is permanently a non-priority lane with respect to the intersecting lane,
   wherein:
   the acquired information on the ambient environment includes lighting-state information indicative of a temporal lighting state of at least one road traffic light related to the intersection and road traffic-sign information indicative of at least one permanent traffic sign related to the intersection;
   the road traffic-sign information represents that the own lane is a permanently non-priority lane with respect to the intersecting lane; and
   the control unit is configured to, even when the lighting-state information represents that entry of the own vehicle into the intersection has priority over the vehicle traveling in the intersecting lane, prevent the own vehicle from entering the intersection.

2. The braking assist control device for the vehicle according to claim 1, wherein
   the intersection entry prevention assist to be performed by the braking assist device comprises a braking assist to cause the own vehicle to decelerate before entry into the intersection.

3. The braking assist control device for the vehicle according to claim 1, wherein
   the intersection entry prevention assist to be performed by the braking assist device comprises a notification given to a driver before entry into the intersection.

4. The braking assist control device for the vehicle according to claim 1, wherein
   the intersection entry prevention assist to be performed by the braking assist device comprises an assist for braking operation by a driver.

5. The braking assist control device for the vehicle according to claim 2, wherein
   the intersection entry prevention assist to be performed by the braking assist device comprises an assist to prevent or inhibit entry into the intersection.

6. A braking assist control system for a vehicle, comprising:
   the braking assist control device according to claim 1;
   the detector; and
   the braking assist device.

7. A braking assist control method for an own vehicle equipped with a detector and a braking assist device, the method comprising:
   acquiring information on an ambient environment of the own vehicle from the detector;
   determining whether the own vehicle is approaching an intersection;
   determining whether an own lane in which the own vehicle is traveling is a permanent non-priority lane with respect to an intersecting lane;
   determining whether the intersecting lane is a permanent priority lane with respect to the own lane using the acquired information on the ambient environment; and
   causing the braking assist device to perform intersection entry prevention assist based on determining that the own vehicle is approaching the intersection, the own lane is the permanent non-priority lane with respect to an intersecting lane, and the intersecting lane is the permanent priority lane with respect to the own lane, wherein:

the acquired information on the ambient environment includes lighting-state information indicative of a temporal lighting state of at least one road traffic light related to the intersection and road traffic-sign information indicative of at least one permanent traffic sign related to the intersection;

the road traffic-sign information represents that the own lane is a permanently non-priority lane with respect to the intersecting lane; and even when the lighting-state information represents that entry of the own vehicle into the intersection has priority over the vehicle traveling in the intersecting lane, the causing prevents the own vehicle from entering the intersection.

* * * * *